US006573919B2

(12) United States Patent
Benear et al.

(10) Patent No.: US 6,573,919 B2
(45) Date of Patent: Jun. 3, 2003

(54) METHOD AND APPARATUS FOR ALIGNMENT OF IMAGE PLANES

(75) Inventors: Richard Benear, Boise, ID (US); Rulon Gregory Esplin, Eagle, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 2 days.

(21) Appl. No.: 09/919,638

(22) Filed: Jul. 31, 2001

(65) Prior Publication Data

US 2003/0025778 A1 Feb. 6, 2003

(51) Int. Cl.[7] ........................ G06G 15/01; B41J 2/385; G01D 15/06

(52) U.S. Cl. ........................ 347/116; 399/299; 399/301

(58) Field of Search ................................ 347/116, 118, 347/117, 129, 115; 399/301, 298, 299

(56) References Cited

U.S. PATENT DOCUMENTS 5,452,073 A * 9/1995 Kataoka ..................... 347/116
5,457,518 A * 10/1995 Ashikaga et al. ........... 347/116
5,946,537 A * 8/1999 Nakayasu et al. .......... 347/116
6,128,459 A * 10/2000 Iwata et al. ................. 347/116
6,236,827 B1 * 5/2001 Hada .......................... 399/301
6,285,383 B1 * 9/2001 Klement et al. ............ 347/116
6,324,375 B1 * 11/2001 Hada et al. ................. 347/116
6,380,960 B1 * 4/2002 Shinohara ................... 347/116
6,408,157 B1 * 6/2002 Tanaka et al. ............. 347/116
6,421,076 B1 * 7/2002 Asaya

* cited by examiner

*Primary Examiner*—Susan S. Y. Lee
(74) *Attorney, Agent, or Firm*—Gregg W. Wisdom

(57) ABSTRACT

An alignment apparatus for use in an electrophotographic imaging device includes a first counter to count a first value of changes of a first signal, with the first value related to a first location of a photoconductor in a first direction. In addition, the alignment apparatus includes a second counter to count a second value of changes of a second signal, with the second value related to a second location of the photoconductor in a second direction substantially perpendicular to the first direction. Additionally, the alignment apparatus includes a circuit coupled to the first and the second counter to generate a change in a third signal after the first and the second counter count to, respectively, the first value and the second value.

24 Claims, 4 Drawing Sheets

METHOD AND APPARATUS FOR ALIGNMENT OF IMAGE PLANES

INTRODUCTION

In electrophotographic imaging devices that form images by overlaying a plurality of planes to form the images, the degree of alignment between the overlaid planes can affect the perceived quality of resulting images. A need exists for a method and apparatus to improve the alignment between overlaid planes.

SUMMARY OF THE INVENTION

An alignment apparatus for use in an electrophotographic imaging device includes a first counter to count a first value of changes of a first signal, with the first value related to a first location of a photoconductor in a first direction. In addition, the alignment apparatus includes a second counter to count a second value of changes of a second signal, with the second value related to a second location of the photoconductor in a second direction substantially perpendicular to the first direction. Additionally, the alignment apparatus includes a circuit coupled to the first and the second counter to generate a change in a third signal after the first and the second counter count to, respectively, the first value and the second value.

A method includes changing a first count responsive to transitions of a first signal and changing a second count responsive to transitions of a second signal. Furthermore, the method includes generating a transition in a third signal after changing the first count a first value of times and after changing the second count a second value of times, with the first value related to a first location of a photoconductor in a first direction and with the second value related to a second location of the photoconductor in a second direction substantially perpendicular to the first direction.

DESCRIPTION OF THE DRAWINGS

A more thorough understanding of an embodiment of the alignment apparatus may be had from the consideration of the following detailed description taken in conjunction with the accompanying drawings in which: Shown in FIG. 1 is a schematic representation of a color electrophotographic printer including an embodiment of the alignment apparatus. Shown in FIG. 2 is a simplified block diagram of an embodiment of a formatter including an embodiment of the alignment apparatus. Shown in FIG. 3 is a simplified block diagram of an embodiment of the alignment apparatus. Shown in FIG. 4 is a timing diagram related to the operation of an embodiment of the alignment apparatus.

DETAILED DESCRIPTION OF THE DRAWINGS

Although embodiments of the alignment apparatus will be discussed in the context of an electrophotographic imaging device, such as a color electrophotographic printer, it should be recognized that embodiments of the alignment apparatus may be usefully applied in other electrophotographic imaging devices, such as electrophotographic copiers, electrophotographic facsimile machines, and the like. In addition, although embodiments of the alignment apparatus will be discussed in the context of a color electrophotographic printer that transfers toner from the photoconductor on which the latent electrostatic image is formed directly to media, it should be recognized that embodiments of the alignment apparatus could be usefully applied in electrophotographic imaging devices that use a transfer member, such as a transfer belt, to receive the image planes. Furthermore, although embodiments of the alignment apparatus will be discussed in the context of a color electrophotographic printer having developing devices positioned at locations along the media path between the media inlet and the media outlet, it should be recognized that embodiments of the alignment apparatus could be usefully applied in electrophotographic imaging devices that use developing devices that rotate into substantially the same position for the development operation.

Figure 1:
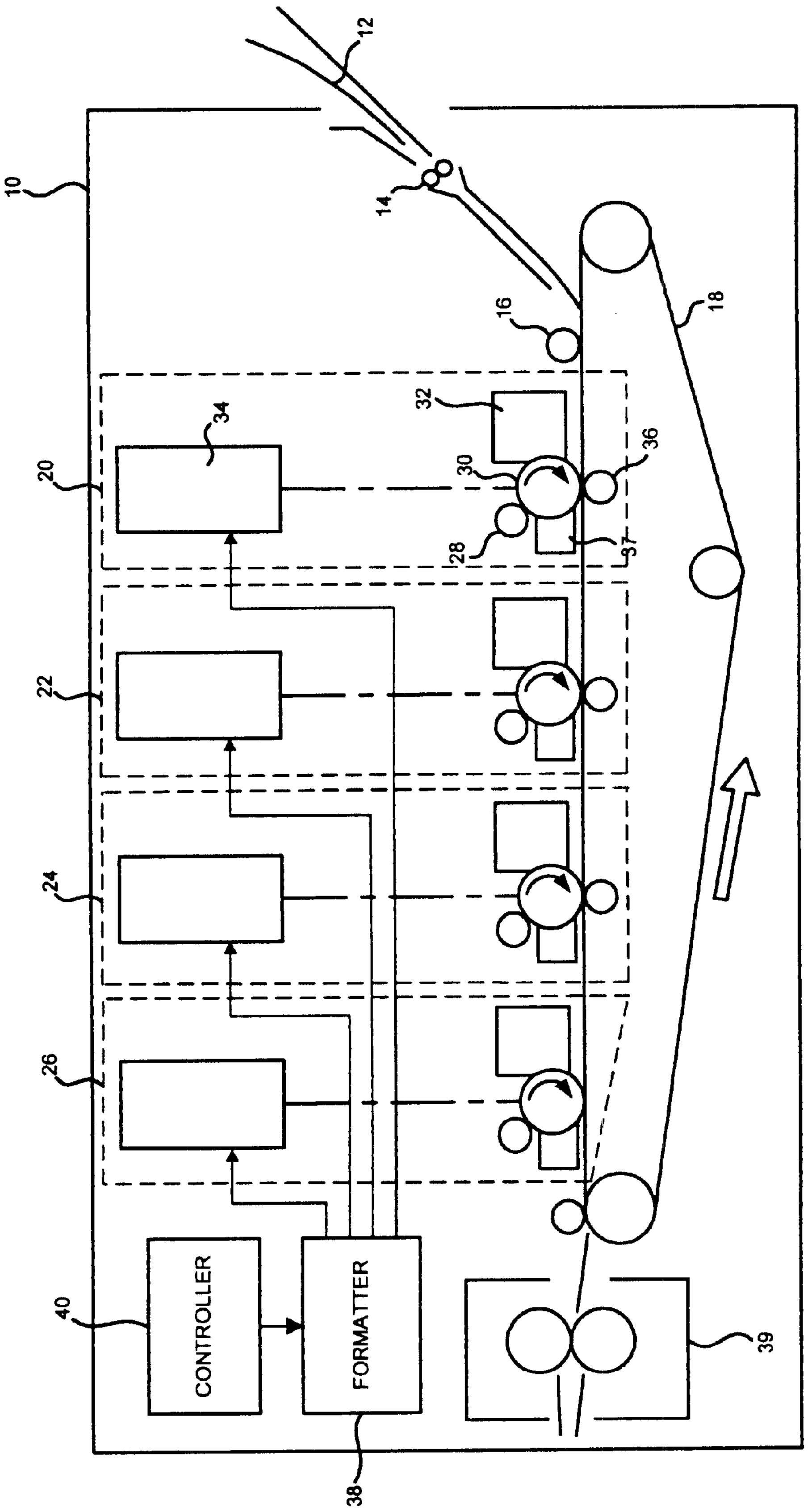

Shown in FIG. 1 is a simplified schematic diagram of a color electrophotographic printer, electrophotographic printer 10 that makes use of an embodiment of the alignment apparatus. Electrophotographic printer 10 operates by placing successive image planes, such as color planes, formed from cyan, magenta, yellow and black colorant, such as toner, onto the media to form the image. The cyan, magenta, yellow, and black toner are used in a subtractive color space to form the image on the media corresponding to image data received by electrophotographic printer 10. The image data may be provided in a high level page description language such as HEWLETT PACKARD COMPANY'S PCL5. Or, the image data may be provided in a lower level page description language that includes rasterized image data. Using the image data, electrophotographic printer 10 generates pixel data for each color plane, compresses this pixel data, and stores it in memory. The compressed pixel data is decompressed, color space converted, and selectively halftoned before formation of an image on media.

A unit of media, such as paper 12, is pulled into electrophotographic printer 10 using input drive rollers 14. Charge roller 16 charges paper 12 to attract it to belt 18. Belt 18 transports paper 12 along the media path so that toner can be developed onto paper 12 at stations along the media path. Electrophotographic printer 10 includes first station 20 for the placement of yellow toner, second station 22 for the placement of magenta toner, third station 24 for the placement of cyan toner, and fourth station 26 for the placement of black toner. Each of the stations includes the hardware necessary for placing toner for a color plane onto paper 12. For example, first station 20 includes a charging device, such as first charge roller 28, a photoconductor, such as first photoconductor drum 30, a developing device, such as first developing assembly 32, an embodiment of a photoconductor exposure system, such as photoconductor drum exposure system 34, a transfer device, such as first transfer roller 36, and first toner waste reservoir 37 for waste toner removed from photoconductor drum 30 after transfer. Second station 22, third station 24, and fourth station 26 include components similar to first station 20.

Consider the formation of an image on paper 12 that will be formed using, along with other color planes, a yellow color plane. First charge roller 28 charges the surface of photoconductor drum 30 to a voltage sufficient to repel toner from undischarged areas during the development process. First photoconductor drum exposure system 34 selectively discharges the surface of photoconductor drum 30 using laser beam 35 to form a latent electrostatic image according to a binary stream of data it receives. First developing assembly 32 develops yellow toner onto the latent electrostatic image formed on the surface of photoconductor drum 30. First transfer roller 36 establishes an electric field between paper 12 and first photoconductor drum 30. In response to this electric field, the yellow toner developed onto first photoconductor drum 30 is transferred onto paper 12. Second station 22, third station 24, and fourth station 26 operate in a similar fashion to form the parts of the image corresponding to, respectively, the cyan color plane, the magenta color plane, and the black color plane.

An embodiment of a processing device, such as formatter 38, provides video signals to each of photoconductor drum exposure systems include within first station 20, second station 22, third station 24, and fourth station 26. Each of the video signals includes a stream of serial binary data that controls the laser diode in the corresponding station to generate the latent electrostatic image on the corresponding photoconductor drum. For each unit of paper 12 onto which an image is to be formed, the stream of serial binary data is delivered at the proper time so that the corresponding color plane formed on paper 12 is at the correct position with respect to the direction paper 12 moves through the media path (the vertical direction) of electrophotographic printer 10 and with respect to the direction substantially perpendicular to the direction paper 12 moves through the media path (the horizontal direction). The four color planes formed from toner on paper 12 after passage through stations 20–26 are fixed onto paper 12 using an embodiment of a fixing device, such as fuser 39.

For electrophotographic printer 10, each of the laser beams generated by the photoconductor drum exposure systems is moved across the corresponding photoconductor drum in a direction that is substantially perpendicular to the direction of movement of paper 12 through the media path. Each pass of the laser beam across the photoconductor drum corresponds to one scan line. In addition to properly timing the delivery of the serial binary data so that the color plane is placed at the proper vertical location (that is the location along the dimension of paper 12 substantially parallel to the direction paper 12 moves through the media path), formatter 38 provides the video signals at the proper time at the beginning of each scan line so that the corresponding color plane formed on paper 12 is at the correct position with respect the direction the laser beam is moved across the respective photoconductor drum (the horizontal direction).

Misalignment of the color planes formed onto paper 12 can cause visible defects in the resulting image. The visible defects resulting from misalignment can include incorrect color reproduction and white gaps at the boundary between regions of different colors. An embodiment of the alignment apparatus included within formatter 38 reduces the misalignment of the color planes in both the vertical direction and the horizontal direction, thereby reducing the severity of visible defects resulting from misalignment. Through the operation of the embodiment of the alignment apparatus, the timing of the delivery of the serial binary data stream to the photoconductor drum exposure systems results in substantial alignment of the color planes.

The embodiment of the alignment apparatus receives values from controller 40. These values are used to properly locate each of the color planes in the vertical direction and the horizontal direction so that misalignment is reduced. The values stored in controller 40 can be derived from measurements made during calibration of electrophotographic printer 10 after manufacturing. The values stored in controller 40 relate to the distance of the stations in the vertical direction 12 when controller 40 generates a change, such as a transition, in the top of page (TOP) signal and relate to the positions of the stations relative to the horizontal direction.

Electrophotographic printer 10 generates the TOP signal after the start of the printing process. The TOP signal is used to control the timing of operations within formatter 38. Those values that relate to the locations in the vertical direction are expressed in terms of the numbers of scan line periods (the time required for the laser beam to make one sweep across the photoconductor) occurring from a change in the TOP signal to the time (for each of the stations) at which scan lines are to be formed on the corresponding photoconductor drum. A change in the TOP signal is generated so that the number of scan line periods occurring between the change in the TOP signal and the arrival of the leading edge of the printable area (the region on a unit of paper 12 on which an image can be formed) consistently equals a predetermined number for each of stations 20–26. It should be recognized that although electrophotographic printer 10 generates the TOP signal at a predetermined time after a unit of paper 12 enters the media path, alternative embodiments of electrophotographic imaging devices could generate a timing signal based upon detection of a leading edge of a unit of paper 12.

The values that relate to the location in the horizontal direction are expressed in terms of the number of cycles of a video clock signal. A period of the video clock signal corresponds to the time required for the laser beam to sweep across a single pixel on the long dimension of the photoconductor drum. Therefore, the values that relate to position in the direction perpendicular to the media path are expressed in terms of the number of pixel time periods (the time required for the laser beam to sweep across a pixel in the horizontal direction).

Figure 2:
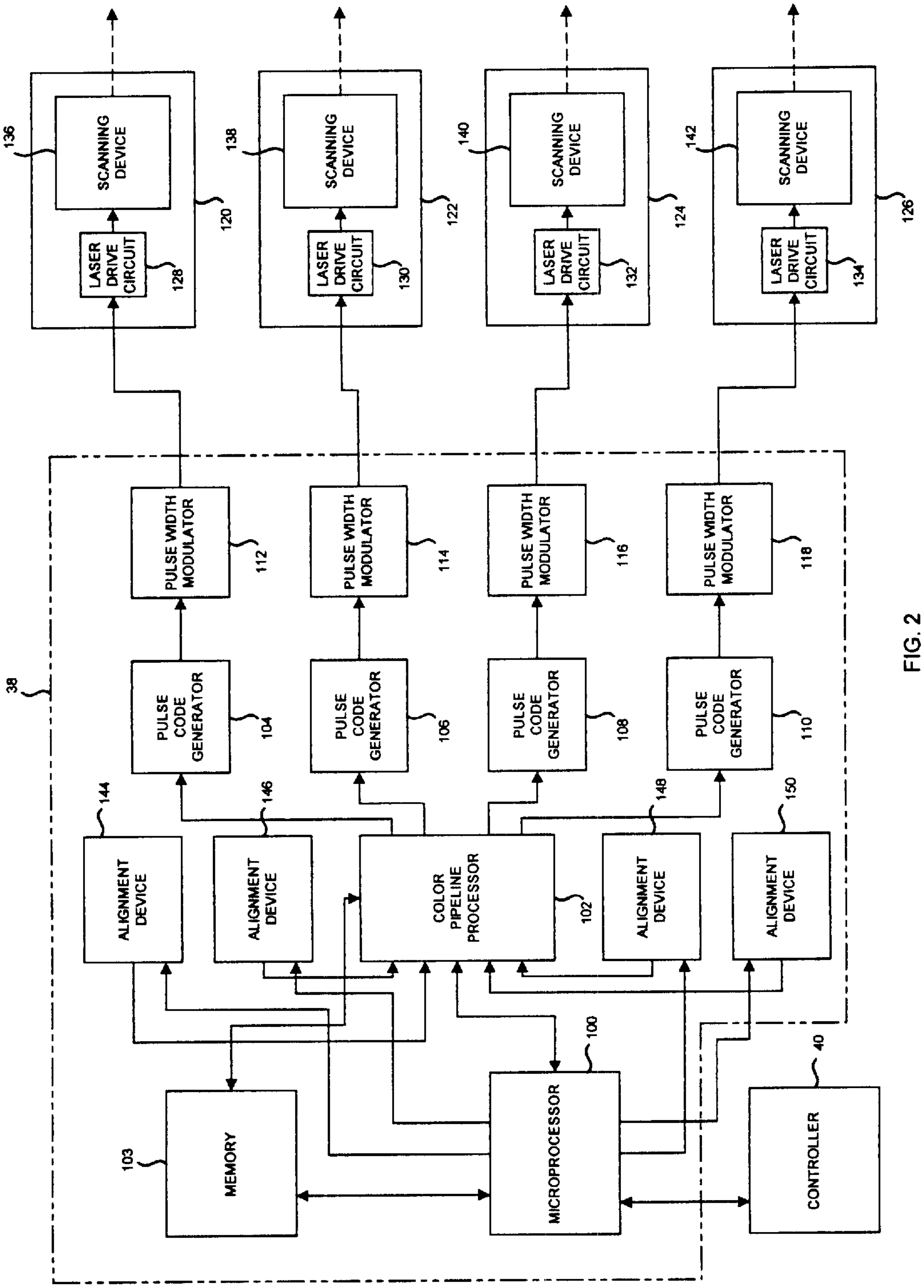

Shown in FIG. 2 is a simplified block diagram of formatter 38. Typically formatter 38 receives image data generated on a computer by executing an application. An embodiment of a processing device, such as microprocessor 100, uses the image data to generate 24 bit per pixel RGB pixel data. This RGB pixel data is delivered to an embodiment of a processing device, such as color pipeline processor 102, for compression. Color pipeline processor includes the capability to perform direct memory accesses to memory 103. Color pipeline processor 102 performs a compression on the RGB pixel data and stores the result in memory 103. It should be recognized that in alternative implementations of formatter 38, a compressor separately implemented from color pipeline processor 102 may be used to compress the RGB pixel data. After storage of the compressed RGB pixel data, color pipeline processor 102 retrieves the compressed RGB pixel data, performs a decompression, a color space conversion (from RGB to CMYK), and a halftone operation on each color plane in the CMYK color space to generate pixel data for each pixel in the C, M, Y, and K color planes. The pixel data for each pixel in each color plane includes 8 bits. Two of the bits specify one of four possible pulse shapes that can be developed in the pixel and six of the bits specify the width of the pulse (or pulses) developed in the pixel. The four possible pulse shapes are center justified in the pixel, left justified in the pixel, right justified in the pixel and split justified on the left and right sides of the pixel.

The pixel data for each of the four color planes is provided to the corresponding ones of pulse code generators 104–110. Using the pixel data for each pixel of the four color planes, pulse code generators 104–110 generate codes used by pulse width modulators 112–118. With the pulse codes received from the corresponding pulse code generators 104–110, pulse width modulators 112–118 generate video signals. Embodiments of pulse code generators and pulse width modulators that could be used within formatter 38 are disclosed in U.S. Pat. No. 6,236,427 issued to Roylance et al. and assigned to Hewlett-Packard Company and in pending U.S. patent application having U.S.PTO Ser. No. 09/534,747, entitled "A METHOD AND DEVICE FOR TIME SHIFTING TRANSITIONS IN AN IMAGING DEVICE" also assigned to Hewlett-Packard Company. The disclosures of U.S. Pat. No. 6,236,427 and U.S.PTO Ser. No. 09/534,747 are incorporated by reference in their entirety into this specification. Photoconductor drum exposure systems 120–126 include laser drive circuits 128–134. The video signals are used used by laser drive circuits 128–134, to generate the laser drive signals used by scanning devices 136–142 included, respectively, within photoconductor drum exposure systems 120–126 in each of stations 20–26.

Scanning devices 136–142 include laser diodes coupled to the output of laser driver circuits 128–134. In addition, scanning devices include a rotating scanning mirror and associated optics that focuses and moves the laser beams generated by the laser diodes across the photoconductor drums. The rotational speed of the mirror is controlled with high accuracy. Through the design of the optics and control of the rotation speed of the mirror, the rate at which the laser beam is moved across the photoconductor drum is kept substantially constant. By maintaining the rate at which the laser beam is moved across the photoconductor drum substantially constant and through the design of pulse width modulators 112–118, very accurate placement of the discharge of regions on the photoconductor drum across each of the scan lines is achieved.

Each of scanning devices 136–142 includes an optical sensor positioned so that it is illuminated by the laser beam before the beginning of its scan across the photoconductor drum. The output of the optical sensor is conditioned to provide a beam detect signal used for synchronizing the delivery of video signals to laser drive circuits 128–134 so that the desired regions on the photoconductor drum are exposed. Typically, the beam detect signal changes, such as on the occurrence of a rising edge transition, when the optical sensor is first illuminated by the laser beam and changes, such as on the occurrence of a falling edge transition, when the optical sensor is no longer illuminated by the laser beam. Sometimes an inverted version of the beam detect signal is used to provide a timing signal Formatter 38 includes embodiments of the alignment apparatus, alignment devices 144–150, one for each of stations 20–26. Alignment devices 144–150 are configured to receive the values stored in controller 40 corresponding to stations 20–26 with which the alignment devices 144–150 are associated. The region on a unit of paper 12 on which an image can be formed is referred to as the printable area. The dimension of the printable area substantially parallel to the direction paper 12 moves through the media path corresponds to the vertical dimension of the printable area. The dimension of the printable area substantially perpendicular to the direction paper 12 moves through the media path corresponds to the horizontal dimension of the printable area.

Controller 40 stores a pair of values for each of stations 20–26. One of the pair of values is related to the number of scan line periods that occur from a change in the TOP signal (such as the generation of a leading edge transition or falling edge transition) until scan lines are to be formed on the photoconductor drum so that the leading vertical edge of the printable area of paper 12 will reach the position on the station at which toner is transferred at the same time the first scan line exposed and developed onto the photoconductor drum rotates to the position at which the toner is transferred. The other of the pair of values is related to the number of video clock cycles that occur from the instant at which the beam detect signal indicates that the laser beam no longer illuminates the optical sensor and the instant at which the laser beam (if present) would illuminate the horizontal edge of the printable area on the photoconductor drum closest to the optical sensor.

With respect to the location of each of stations 20–26 in the vertical direction, each of alignment devices 144–150 receives the corresponding value (expressed as a number of scan line periods) from controller 40. It should be recognized that the values relating to the number of scan line periods accounts for the number of scan line periods that occur between the time at which exposure of the photoconductor drum occurs and the time at which transfer of this developed portion of the latent image occurs. That is, the time (in terms of the number of scan line periods that occur) required for an exposed area on the photoconductor drum to rotate into position for transfer of the toner is subtracted from the number of scan line periods that occur between a change in the TOP signal and the arrival of the leading vertical edge of the printable area at the location on a station where the transfer of toner can occur. However, it should also be recognized that the values received from controller 40 could be provided without accounting for the number of scan lines for rotation of the photoconductor drum into position for transfer of toner onto paper 12.

With respect to the location of the horizontal edge of the printable area of paper 12 relative to the location of the beam detect optical sensor, each of alignment devices 144–150 receives the corresponding value (expressed as a number of video clock cycles) from controller 40. The values specify the time from the instant at which the optical sensor is no longer illuminated by the laser beam (the falling edge transition of the beam detect signal) to the instant at which the laser beam could illuminate the horizontal edge of the printable area on the photoconductor drum closest to the optical sensor. As previously mentioned, the distance the laser beam moves during one video clock cycle equals a distance across a pixel in the horizontal direction (a direction parallel to the longitudinal axis of the photoconductor drum).

Using the values received from controller 40 relating to the number of scan line periods, each of alignment devices 144–150 generates changes in a group of virtual vertical synchronization signals (one virtual vertical synchronization signal for each of alignment devices 144–150). The timing of the generation of changes in the group of virtual vertical synchronization signals accounts for the number of pulses of the beam detect signal that occur (for each of the corresponding ones of stations 20–26) from a change in the TOP signal until color pipeline processor 102 begins supplying pixel data to the respective ones of pulse code generators 104–110.

Using the values received from controller 40 relating to the number of video clock cycles, each of alignment devices 144–150 generates changes in a group of virtual horizontal synchronization signals (one virtual horizontal synchronization signal for each of alignment devices 144–150). The timing of the generation of the group of virtual horizontal synchronization signals accounts for the time period between ending the illumination of the optical sensor by the laser beam until the laser beam is positioned to illuminate the horizontal edge of the printable area closest to the optical sensor. In addition, the timing of the generation of changes in the group of virtual horizontal synchronization signals may account for the time it takes for the laser beam to move from a position at which it could illuminate the horizontal edge of the printable area to the horizontal margin of paper 12 by adding the corresponding number of video clock cycles required for this change in position of the laser beam to the corresponding values received from controller 40. Furthermore, the timing of the generation of changes in the group of virtual horizontal synchronization signals may account for the time (in terms of the number of video clock cycles) it takes for color pipeline processor 102, pulse code generators 104–110 and pulse width modulators 112–118 to generate, respectively, the pixel data, the pulse codes used by pulse width modulators 112–118 and the drive signals supplied to laser drive circuits 128–134 by subtracting the corresponding number of video clock cycles from the corresponding values received from controller 40.

Included within alignment devices 144–150 are logic circuits. The group of virtual vertical synchronization signals and the group of virtual horizontal synchronization signals are combined within these logic blocks. Each of the logic circuits combines one virtual vertical synchronization signal and one virtual horizontal synchronization signal. Included within each of the logic circuits are synchronous state machines that, when the corresponding vertical and virtual horizontal synchronization signals are asserted at the proper time, cause assertion of the corresponding send_pixel_data signals coupled to color pipeline processor 102. Assertion of these send_pixel_data signals causes color pipeline processor 102 to begin supplying the pixel data for the corresponding color planes to pulse code generators 104–110. When one or more of the send_pixel_data signals are not asserted, color pipeline processor 102 supplies 8 bit zero values to the respective ones of pulse code generators 104–110. While the 8 bit zero values are provided to one or more of pulse code generators 104–110, the corresponding ones of laser drive circuits 128–134 generate laser drive signals so that no laser beam is emitted from the respective ones of scanning devices 136–142. The control of the timing for the delivery of data from color pipeline processor 102 to pulse code generators 104–110 by alignment devices 144–150 at least partially compensates for the misalignment that would occur between color planes had nominal expected values for the horizontal and vertical locations of stations 20–26 with respect to the media paths been used. In this manner, alignment devices 144–150 reduce misalignment between the four color planes that form the image on paper 12, thereby improving image quality.

Figure 3:
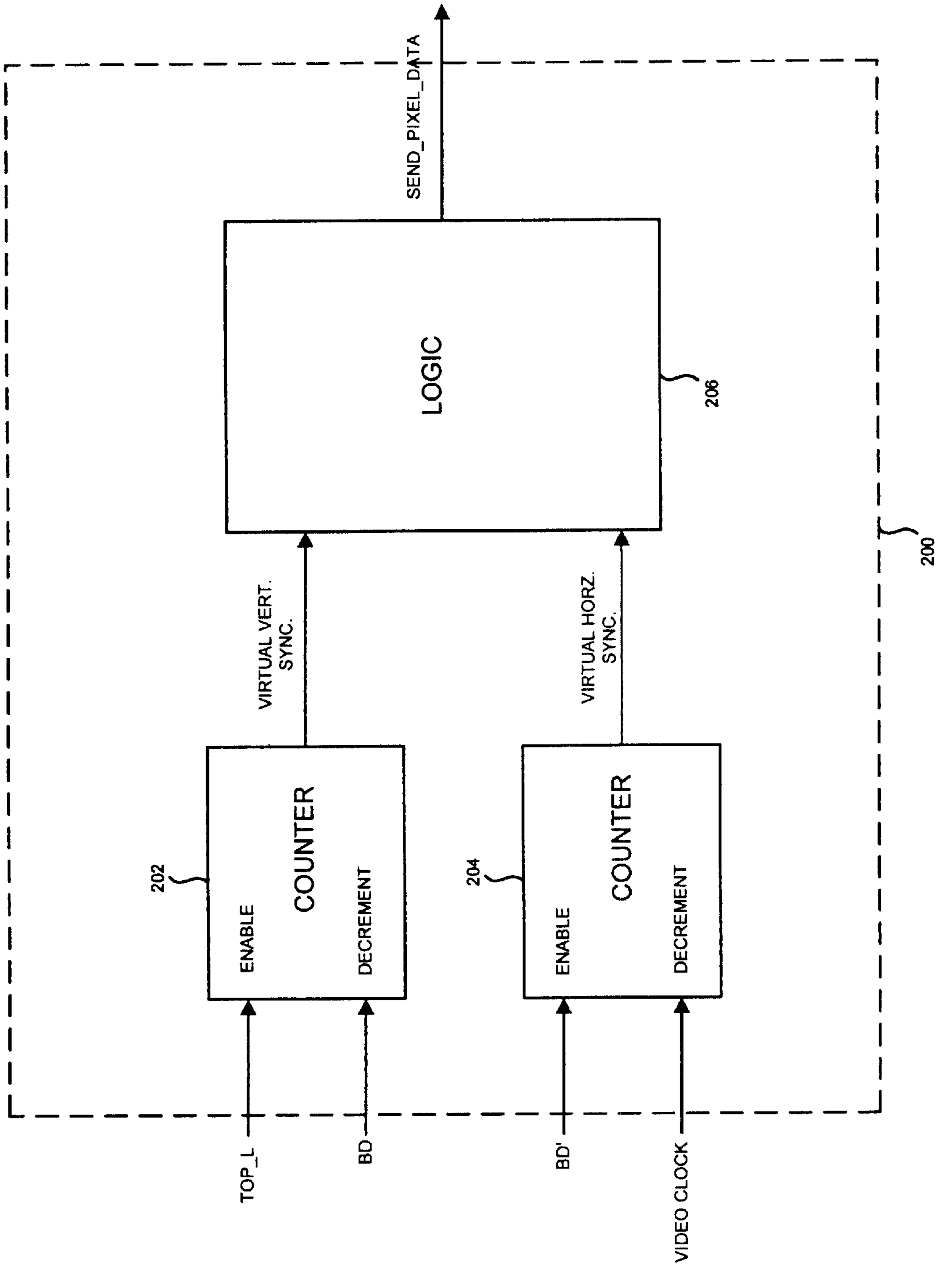

Shown in FIG. 3 is a simplified block diagram of an embodiment of the alignment apparatus, alignment device 200. Alignment device 200 includes first counter 202. The value received from controller 40 relating the position of the corresponding station in terms of the number of scan line periods in the vertical direction is loaded into first counter 202. Alignment device 200 includes second counter 204. The value received from controller 40 specifying the position of the corresponding station in terms of the number of video clock cycles in the horizontal direction is loaded into second counter 204.

First counter 202 includes an enable input and a decrement input. When the enable input is asserted, transitions occurring on the decrement input cause the value stored in first counter 202 to be decremented by one. The enable input is coupled to a latched version of the TOP signal (the TOP_L signal) provided by controller 40. The TOP signal changes to an asserted state for a short time after a unit of paper 12 enters the media path and arrives at a predetermined location in the media path. The beam detect (BD) signal (or a signal derived from the beam detect signal) is coupled to the decrement input so that for each generation of a beam detect pulse while the TOP_L signal is asserted (as it is during a period of time for a print sequence for a unit of paper 12), the count stored in first counter 202 is decremented by one. First counter 202 includes logic so that when the value initially stored in first counter 202 is decremented to zero a virtual vertical synchronization pulse is generated. By decrementing the count in first counter 202 in respond to changes in the beam detect signal, first counter 202 counts beam detect signals. It should be recognized that first counter 202 could be configured to count by incrementing in response to changes in the beam detect signal and generate a virtual vertical synchronization pulse when the count reaches the value received from controller 40.

Second counter 204 includes an enable input and a decrement input. When the enable input is asserted, transitions occurring on the decrement input cause the value stored in second counter 204 to be decremented by one. The enable input is coupled to a signal (BD') derived from the beam detect pulse. The signal is held at the asserted level after the beam detect pulse occurs. The signal is held at the asserted level at least until the laser beam is positioned so that it could illuminate an area on the photoconductor drum (corresponding to the horizontal edge of the printable area on paper 12) for one or more of stations 20–26 configured to have the largest possible distance between the optical sensor and the area on the photoconductor drum. The video clock is coupled to the decrement input so that for each cycle of the video clock that occurs, while the enable input of second counter 204 is held at the asserted level, the count stored in second counter is decremented by one. Second counter 204 includes logic configured so that when the value initially stored in second counter 204 is decremented to zero a virtual horizontal synchronization pulse is generated. By decrementing the count in second counter 204 in respond to changes in the video clock, second counter 204 counts beam detect signals. It should be recognized that second counter 204 could be configured to count by incrementing in response to changes in the video clock and generate a virtual horizontal synchronization pulse when the count reaches the value received from controller 40.

The virtual vertical synchronization pulse and the virtual horizontal synchronization pulse are combined within logic block 206 to generate the send_pixel_data signal coupled to color pipeline processor 102. Each of alignment devices 144–150 generates one of these send_pixel_data signals, with each of the send_pixel_data signals corresponding to one of the C, Y, M, or K color planes. Logic block 206 includes a state machine that operates to generate the send_pixel_data signal at the proper time for each scan line using the virtual vertical synchronization pulse and the virtual horizontal synchronization pulse to account for the vertical and horizontal positions of stations 20–26. Alignment devices 144–150 permit color planes to be substantially aligned down to one pixel of offset between color planes.

Figure 4:
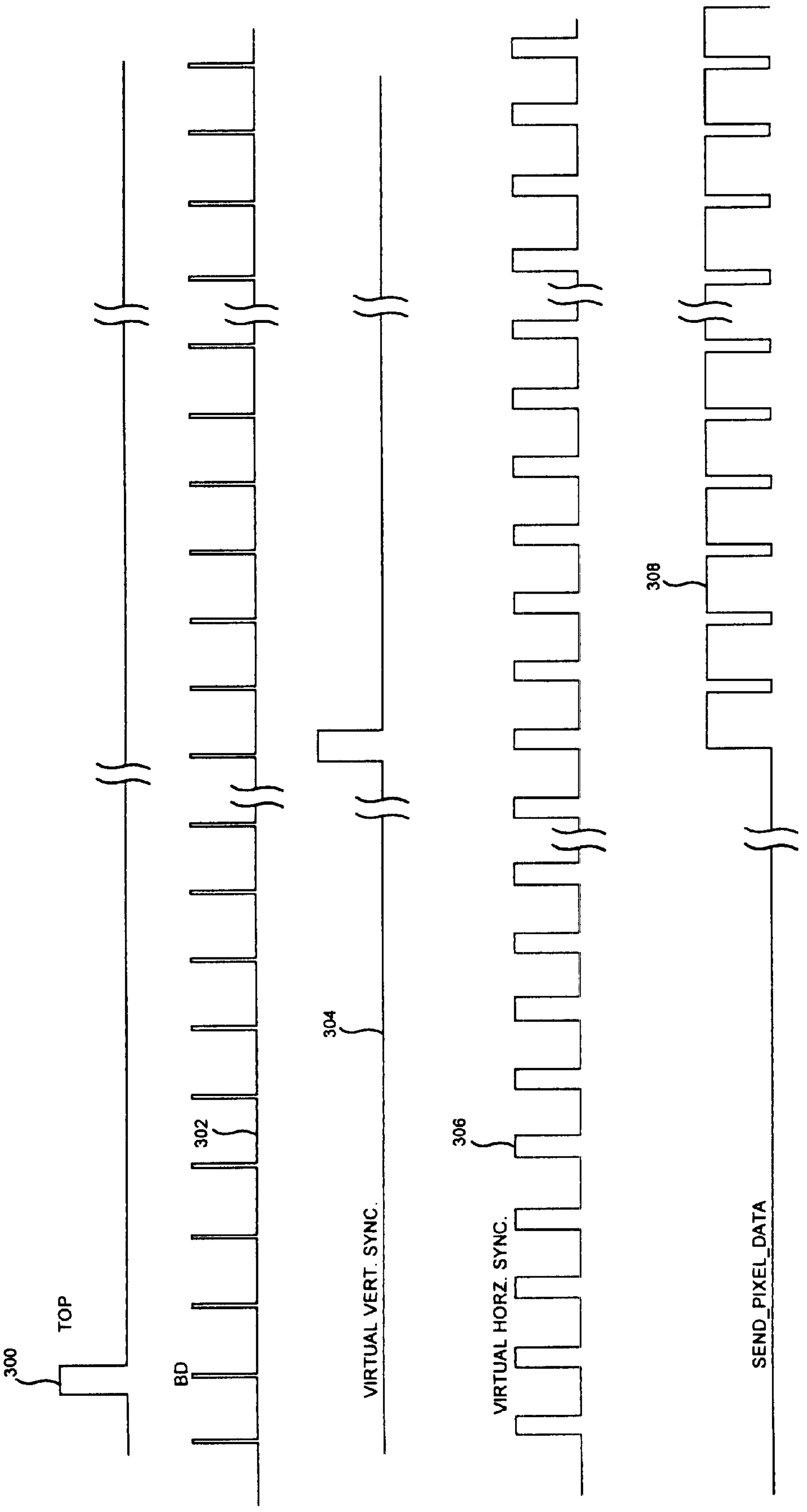

Shown in FIG. 4 is a timing diagram showing an exemplary timing relationship between TOP signal 300, beam detect pulse 302, virtual vertical synchronization signal 304, virtual horizontal synchronization signal 306, and send_pixel_data signal 308. Logic block 206 generates the changes in the send_pixel_data signals (of which send_pixel_data signal 308 is exemplary) so that they are asserted during the time that color pipeline processor 102 is to provide pixel data to pulse code generators 104–110. During the times for which send_pixel_data signal 308 is not asserted, color pipeline processor 102 supplies successive 8 bit zero values to the respective ones of pulse code generators 104–110.

Although embodiments of the alignment apparatus have been discussed in the context of an electrophotographic imaging device that transfers the successive color planes directly from the developed latent image to media, it should be recognized that embodiments of the alignment apparatus may be used in other types of electrophotographic imaging devices. For example, an electrophotographic imaging device that successively formed color planes on a transfer member, such as a transfer belt, and then transferred the image formed on the transfer belt to the media could make use of embodiments of the alignment apparatus to reduce misalignment between the color planes. For these types of electrophotographic imaging devices, the embodiments of the alignment apparatus reduce misalignment of the color planes formed on the transfer belt and this reduced misalignment is reflected in the image transferred from the transfer belt to the media.

The operation of the embodiments of the alignment apparatus have been discussed in the context in which the vertical dimension of pixels (corresponding to the dimension of the pixel in a direction substantially parallel to the direction media moves in the media path) and the horizontal dimension of pixels (corresponding to the dimension of the pixel in a direction substantially perpendicular to the direction the media moves in the media path) remain substantially constant across a unit of media. However, there are spatial distortion effects that can occur in either the horizontal direction and the vertical direction across the media. These spatial distortion effects may result in varying degrees of alignment between color planes in either the horizontal or vertical directions across units of the media. For example, in the vertical direction there may be exact alignment between the color planes near the leading vertical edge of the a unit of paper but midway between the leading vertical edge and the trailing vertical edge there may be several pixels of misalignment occurring between color planes. The misalignment may result from, for example, changes in the speed at which the unit of paper moves at different locations in the media path, changes in the physical dimensions in the unit of paper as it moves through the media path, the cumulative effects of variations in the rate at which the laser beam is swept across the unit of paper, or combinations of factors such as these.

One way in which to at least partially compensate for the effects of varying degrees of alignment between color planes is to determine values that approximate the average value of misalignment in the horizontal direction and in the vertical direction over the area of the unit of paper that would result from the spatial distortion effects alone. That is, if alignment between the color planes existed on one edge of the unit of paper, misalignment between the color planes may exist on other regions of the unit of paper. The values representing the average misalignment over the unit of paper would be combined with the values representing the positions of stations 20–26 in the vertical direction and the values representing the positions of stations 20–26 in the horizontal direction. Consider the case in which the spatial distortion results in a maximum misalignment across the unit of paper for one of the color planes in the vertical direction of 4 pixels and a maximum misalignment across the unit of paper in the horizontal direction of 2 pixels. The corresponding values received from controller 40 for the one of stations 20–26 would be adjusted by an average value of 2 scan lines in the vertical direction and 1 pixel in the horizontal direction to provide partial offset for the spatially varying misalignment in the vertical and horizontal directions. Whether these values would be added to or subtracted from the values received from controller 40 would depend upon the direction of the misalignment (resulting from the spatial distortion) with respect to the horizontal or vertical directions.

Although an embodiment of the alignment apparatus has been illustrated and described, it is readily apparent to those of ordinary skill in the art that various modifications may be made to this embodiment without departing from the scope of the appended claims.

What is claimed is:

1. An alignment apparatus for use in an electrophotographic imaging device, comprising:

a first counter to count a first value of changes of a first signal, with the first value related to a first location of a photoconductor in a first direction;

a second counter to count a second value of changes of a second signal, with the second value related to a second location of the photoconductor in a second direction substantially perpendicular to the first direction; and a circuit coupled to the first and the second counter to generate a change in a third signal after the first and the second counter count to, respectively, the first value and the second value.

2. The alignment apparatus as recited in claim 1, wherein:

the changes of the first signal correspond to transitions of the first signal;

the changes of the second signal correspond to transitions of the second signal;

the change of the third signal corresponds to a transition of the third signal;

the first value corresponds to a first number of the transitions of the first signal; and the second value corresponds to a second number of the transitions of the second signal.

3. The alignment apparatus as recited in claim 2, wherein:

the first counter includes a configuration to decrement from the first number responsive to the transitions of the first signal;

the second counter includes a configuration to decrement from the second number responsive to the transitions of the second signal; and the circuit includes a configuration to generate the transitions in the third signal after contents of the first counter and the second counter reach zero.

4. The alignment apparatus as recited In claim 3, wherein:

the first direction exists substantially parallel to movement of media in a media path included with the eletrophotographic imaging device; and the second direction exists substantially perpendicular to the movement of the media in the media path.

5. The alignment apparatus as recited in claim 4, wherein:

the transitions in the first signal relate to illumination of an optical sensor included within the electrophotographic imaging device by a laser beam; and the second signal includes a clock signal.

6. The alignment apparatus as recited in claim 5, wherein:

the first counter includes a configuration to begin decrementing responsive to a transition of a fourth signal occurring substantially contemporaneous with an edge of a printable area on the media moving in the first direction to a predetermined position in the media path.

7. The alignment apparatus as recited in claim 6, wherein:

the second counter includes a configuration to begin decrementing responsive to the transitions of the first signal.

8. The alignment apparatus as recited in claim 7, further comprising:

a processing device configured to supply pixel data responsive to the transitions of the third signal.

9. The alignment apparatus as recited in claim 8, wherein:

the circuit includes a configuration to assert the third signal during a time period for the processing device to provide pixel data to substantially align image planes;

the first signal includes a beam detect signal;

the clock signal includes a video clock signal; and the fourth signal includes a top of page signal.

10. A method comprising:

changing a first count responsive to transitions of a first signal;

changing a second count responsive to transitions of a second signal; and generating a transition in a third signal after changing the first count a first value of times and after changing the second count a second value of times, with the first value related to a first location of a photoconductor in a first direction and with the second value related to a second location of the photoconductor in a second direction substantially perpendicular to the first direction.

11. The method as recited in claim 10, further comprising:

providing data responsive to the transition in the third signal.

12. The method as recited in claim 11, further comprising:

generating a second transition in the third signal, where generating the transition corresponds to generating a first transition; and providing null data responsive to the second transition.

13. The method as recited in claim 12, further comprising:

receiving the first value into a first counter to initialize the first count before changing the first count; and receiving the second value into a second counter to initialize the second count before changing the second count.

14. The method as recited in claim 13, wherein:

changing the first count includes decrementing the first count responsive to the transitions of the first signal;

changing the second count includes decrementing the second count responsive to the transitions of the second signal; and generating the first transition in the third signal includes generating the first transition in the third signal after the first count and the second count reach zero.

15. The method as recited in claim 14, wherein:

the first direction exists substantially parallel to movement of media in a media path included with the electrophotographic imaging device; and the second direction exists substantially perpendicular to the movement of the media in the media path.

16. The method as recited in claim 15, wherein:

generating the first transition and generating the second transition in the third signal occur to provide the data for placing an image plane at a predetermined location on media.

17. The method as recited in claim 15, wherein:

generating the first transition and generating the second transition occur to provide the data for placing a corresponding image at a predetermined location on a transfer member.

18. An electrophotographic imaging device, comprising:

a first station configured to develop a first toner onto a first photoconductor;

a second station configured to develop a second toner onto a second photoconductor;

an alignment apparatus configured to assert a first or a second signal related, respectively, to a first location of the first photoconductor, and a second location of the second photoconductor; and a processing device to generate pixel data used in forming latent electrostatic images on the first and the second photoconductor responsive to assertion of at least one of the first and the second signal.

19. The electrophotographic imaging device as recited in claim 18, wherein:

the alignment apparatus includes a first counter to count a first value of transitions of a third signal, with the first value related to a first location of a photoconductor in a first direction, a second counter to count a second value of transitions of a fourth signal, with the second value related to a second location of the photoconductor in a second direction substantially perpendicular to the first direction, and a circuit coupled to the first and the second counter to assert the first signal after the first and the second counter count to, respectively, the first value and the second value.

20. The electrophotographic imaging device as recited in claim 19, wherein:

the first counter includes a configuration to decrement from the first value responsive to the transitions of the third signal;

the second counter includes a configuration to decrement from the second value responsive to the transitions of the fourth signal; and the circuit includes a configuration to assert the first signal after contents of the first counter and the second counter reach zero.

21. The electrophotographic imaging device as recited in claim 20, wherein:

the first direction exists substantially parallel to movement of media in a media path included with the electrophotographic imaging device;

the second direction exists substantially perpendicular to the movement of the media in the media path;

the transitions in the third signal relate to illumination of an optical sensor included within the electrophotographic imaging device by a laser beam; and the fourth signal includes a clock signal.

22. The electrophotographic imaging device as recited in claim 21, wherein:

the first counter includes a configuration to begin decrementing responsive to a transition of a fifth signal occurring substantially contemporaneous with an edge of a printable area on the media moving in the first direction to a predetermined position in the media path; and the second counter includes a configuration to begin decrementing responsive to the transitions of the third signal.

23. An electrophotographic printer, comprising:

a first station for developing cyan toner onto a first photoconductor;

a second station for developing magenta toner onto a second photoconductor;

a third station for developing yellow toner onto a third photoconductor;

a fourth station for developing black toner onto a fourth photoconductor;

an image plane registration device configured to generate a first, a second, a third, and a fourth send data signal using, respectively, a first, a second, a third, and a fourth pair of values each related to a position of the first, the second, the third, and the fourth photoconductor;

a color pipeline processor to generate a first, a second, a third, and a fourth set of pixel data responsive, respectively, to assertion of at least one of the first, the second, the third, and the fourth send data signal; and a first, a second, a third, and a fourth pulse code generator to generate, respectively, a first set, a second set, a third set, and a fourth set of pulse codes from, respectively, the first set, the second set, the third set, and the fourth set of pixel data;

a first, a second, a third, and a fourth pulse width modulator to generate, respectively, a first, a second, a third, and a fourth drive signal, from respectively, the first, the second, the third, and the fourth set of pulse codes; and a first, a second, a third, and a fourth photoconductor exposure system to form, a first, a second, a third, and a fourth latent electrostatic image on, respectively, the first, the second, the third, and the fourth photoconductor using, respectively, the first, the second, the third, and the fourth drive signal.

24. The electrophotographic printer as recited in claim 23, wherein:

the image plane registration device includes a first, a second, a third, and a fourth alignment apparatus;

the first alignment apparatus include a first counter to count a first value of changes of a first signal, with the first value related to a first location of a photoconductor in a first direction;

a second counter to count a second value of changes of a second signal, with the second value related to a second location of the photoconductor in a second direction substantially perpendicular to the first direction; and a circuit coupled to the first and the second counter to generate changes in the first send data signal after the first and the second counter count to, respectively, the first value and the second value.

* * * * *